United States Patent [19]

Nozawa et al.

[11] Patent Number: 4,567,342
[45] Date of Patent: Jan. 28, 1986

[54] METHOD AND APPARATUS FOR CONTROLLING DIRECTION REVERSAL IN ELECTRIC DISCHARGE MACHINES

[75] Inventors: Ryoichiro Nozawa, Tokyo; Mitsuo Kinoshita; Teruyuki Matsumura, both of Hachioji, all of Japan

[73] Assignee: Fanuc Ltd, Minamitsuru, Japan

[21] Appl. No.: 507,494

[22] Filed: Jun. 24, 1983

[30] Foreign Application Priority Data

Jun. 24, 1982 [JP] Japan ................................ 57-108866

[51] Int. Cl.[4] ............................ B23P 1/12; G05B 9/02
[52] U.S. Cl. .............................. 219/69 M; 219/69 C; 219/69 S; 318/563; 364/167; 364/183; 364/474
[58] Field of Search ................ 219/69 G, 69 M, 69 C, 219/69 S; 318/563, 565, 569, 571; 364/167, 176, 177, 183, 474

[56] References Cited

U.S. PATENT DOCUMENTS

| | | | |
|---|---|---|---|
| 2,829,322 | 4/1958 | Silva | 364/177 |
| 3,564,190 | 2/1971 | Kandajan et al. | 219/69 M |
| 3,731,044 | 5/1973 | Ullmann et al. | 219/69 G |
| 3,860,779 | 1/1975 | Marendaz | 219/69 C |
| 3,973,104 | 8/1976 | Ullmann et al. | 219/69 C |
| 4,071,729 | 1/1978 | Bell, Jr. | 219/69 C |
| 4,321,516 | 3/1982 | Ohtuska | 318/571 |
| 4,471,443 | 9/1984 | Kinoshita et al. | 364/474 |
| 4,484,287 | 11/1984 | Gamo et al. | 364/474 |

FOREIGN PATENT DOCUMENTS

| | | | |
|---|---|---|---|
| 2638584 | 3/1978 | Fed. Rep. of Germany | 219/69 G |
| 52-43080 | 4/1977 | Japan | 318/569 |
| 123018 | 9/1981 | Japan | 318/569 |

Primary Examiner—C. L. Albritton
Assistant Examiner—Geoffrey S. Evans
Attorney, Agent, or Firm—Staas & Halsey

[57] ABSTRACT

A system for reversing the direction of an electric discharge machine in response to a short-circuit signal. A controller responds to the short circuit signal by generating a command signal with a magnitude greater than a stored error between a commanded value and a number of feedback pulses produced by rotation of a motor which drives the electrode. The sign of the generated command signal is opposite to that of the stored error so that the stored error is converted into a value capable of reversing the direction of the electrode without delay.

13 Claims, 5 Drawing Figures

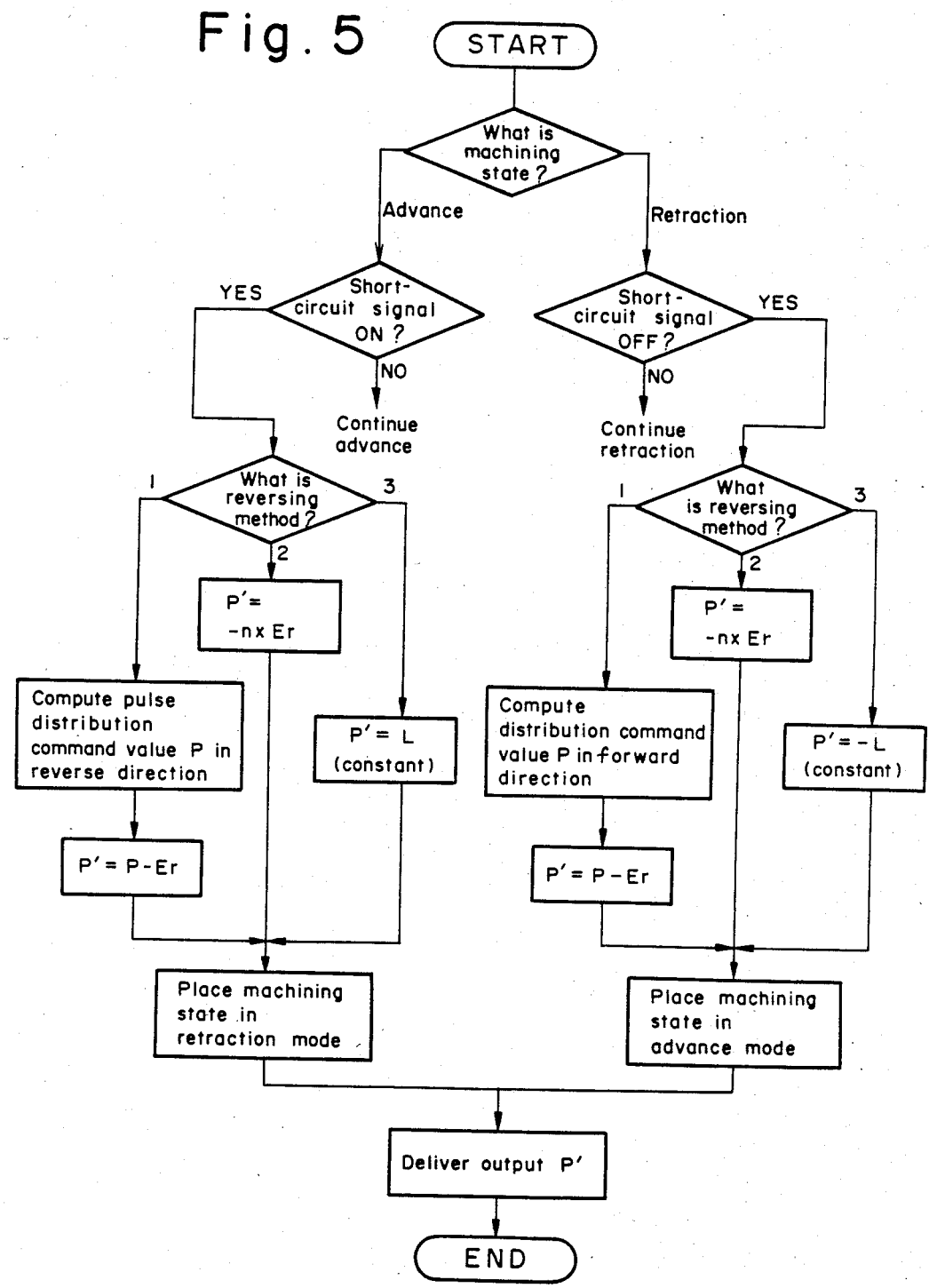

METHOD AND APPARATUS FOR CONTROLLING DIRECTION REVERSAL IN ELECTRIC DISCHARGE MACHINES

BACKGROUND OF THE INVENTION

This invention relates to a reversal control method and apparatus in an electric discharge machine. More particularly, the invention relates to a control method and apparatus for reversing traveling direction and is suited for application to an electric discharge machine in which an electrode, held close to the surface of a workpiece, is moved into the workpiece to perform cutting while an electric discharge is produced across the electrode and the workpiece, thereby machining the workpiece into a shape similar to that of the electrode.

Electric discharge machines include two types. The first is a wire-cut electric discharge machine wherein a wire electrode is moved relative to a workpiece along a commanded path, thereby performing electric discharge machining. The second type is an electric discharge machine wherein an electrode of a prescribed shape, held close to the surface of a workpiece, is moved into the workpiece to perform cutting while an electric discharge is produced across the electrode and the workpiece, thereby machining into the workpiece a shape similar to that of the electrode.

FIG. 1 is a schematic explanatory view of the electric discharge machine. An electrode EP serving as a punch or a wire electrode punch, is supported by a spindle SP, and is fed for machining in the direction of the arrow by a servomotor, not shown. A voltage is applied by a power source PS across the electrode EP and a workpiece WK, which is to be machined into a die. Accordingly, when the electrode EP is advanced for machining while a minute gap is maintained between the workpiece WK and the electrode EP, the workpiece WK is machined into a shape similar to that of the electrode EP. An enlarged bore having a desired size can be readily machined in the workpiece WK by controlling, e.g., the machining pulses and energy. If necessary, the machining operation is carried out while the electrode EP is moved in an eccentric fashion, whereby an enlarged bore having the desired dimensions can be machined.

In the electric discharge machine of the above type, it is necessary to retract (reverse) the electrode immediately upon the generation of a short-circuit signal produced when the electrode EP contacts the workpiece WK. With the conventional arrangement, however, the electrode EP cannot be retracted immediately even if the direction of electrode movement is changed upon generation of the short-circuit signal.

FIG. 2 is a block diagram of the prior-art reversal control apparatus and is useful in understanding the foregoing problem. In FIG. 2, numeral 101 denotes a paper tape in which NC command data is punched. Numeral 102 denotes a control unit which causes a tape reader (not shown) to read in the numerical control (NC) data from the paper tape 101, and which decodes the read NC data, delivering, e.g., M, S and T (Miscellaneous, Spindle Speed, and Tool) function) commands to the machine (FIG. 1) through a magnetics unit not shown and a move command Zc to a pulse distributor 103. The pulse distributor 103 executes well-known pulse distribution computations on the basis of the move command Zc and generates distributed pulses $P_s$ at a frequency corresponding to a commanded speed. Numeral 104 designates a known accelerator/decelerator circuit which generates a train of pulses Pi by rectilinearly accelerating the pulse rate of the train of distributed pulses Ps at the start of the distributed pulse train and rectilinearly decelerating the pulses at the end of the distributed pulse train. Numeral 105 indicates a D.C. motor by which the electrode EP is fed for machining. Numeral 106 denotes a pulse coder which generates one feedback pulse FP each time the DC motor 105 rotates by a predetermined amount. Numeral 107 denotes an error calculating and storing unit comprising by, e.g., a reversible counter. The difference Er between the number of input pulses Pi received from the accelerator/decelerator circuit 104 and the number of feedback pulses FP received from the pulse coder 106 is output by the error unit 107. The error calculating and storing unit 107 may be constructed, as illustrated, of an arithmetic circuit 107a for calculating the difference Er between the numbers of pulses Pi and FP, and an error register 107b for storing the error Er. More specifically, assuming that the DC motor 105 is rotating in the forward or positive direction, the error calculating and storing unit 107 counts up the input pulses Pi each time one is generated and counts down the feedback pulses FP each time one is generated, the difference Er between the number of input pulses and feedback pulses being stored in the error register 107b. Numeral 108 denotes a digital-/analog (D/A) converter for generating an analog voltage proportional to the content of the error register 107b, and numeral 109 a speed control circuit.

When the control unit 102 produces the move command Zc, the pulse distributor 103 executes a pulse distribution computation and provides the distributed pulses Ps. Upon receiving the pulses Ps, the accelerator/decelerator circuit 104 accelerates and decelerates the pulse rate thereof and applies the train of command pulses Pi to the error calculating and storing unit 107. Thus, the content of the error register 107b becomes non-zero, so that the DA converter 108 provides a voltage and the motor 105 is driven by the speed control circuit 109 and moves the electrode EP. When the motor 105 has rotated by a predetermined amount, the feedback pulse FP is generated by the pulse coder 106 and is applied to the error calculating and storing unit 107. The difference ER between the number of commanded pulses Pi and the number of feedback pulses FP is stored in the error register 107b. Thenceforth, the electrode EP is servocontrolled to make the difference Er approach zero, whereby the electrode EP is fed for machining and moved toward a target position.

As the electrode EP is being fed for machining, the electrode EP will contact the workpiece WK, causing a short-circuit signal SS to be produced. When this occurs, a retraction control operation is performed by the control unit 102 to apply a retraction command to the pulse distributor 103, calling for retraction of the electrode EP. The pulse distributor 103 responds to the retraction command by generating retraction or "back-up" pulses BS for movement in the direction opposite to the feed direction, which pulses step down the contents of the error register 107b to zero upon passage of a predetermined period of time. Thereafter, the electrode EP is retracted by the retraction pulses to break contact with the workpiece WK.

Thus, with the conventional arrangement of FIG. 2, the electrode EP will not begin to be retracted, despite generation of the short-circuit signal SS, until the state of the error register 107b becomes zero, this occuring after a predetermined length of time. In fact, since the state of the error register 107b is non-zero for the predetermined length of time following the generation of the short-circuit signal SS, the electrode EP will continue to advance until the zero state is attained. The result is a delay in the resumption of machining, thereby lengthening the time required for the machining process.

SUMMARY OF THE INVENTION

Accordingly, an object of the present invention is to provide a method and apparatus for reversing the direction of an electric discharge machine, through which an electrode can be retracted immediately upon generation of a short-circuit signal.

Another object of the present invention is to provide a method and apparatus for reversing the direction of an electric discharge machine, whereby damage to an electrode can be prevented by diminishing the duration of the short circuit, and wherein the time required for the machining process can be reduced by promptly resuming machining.

According to the present invention, the foregoing objects are attained by providing a system for reversing the direction of an electric discharge machine, in which following a short-circuit signal generated when an electrode contact a workpiece, a reversal command signal is produced having a magnitude greater than a stored error between a commanded value and a number of feedback pulses generated by rotation of a motor. The magnitude of the generated command signal is sufficiently large that the stored error is converted into a value capable of reversing the direction of the electrode without delay.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a flowchart of the reversal control method of the present invention.

DESCRIPTION OF THE PREFERRED EMBODIMENT

Figure 2:
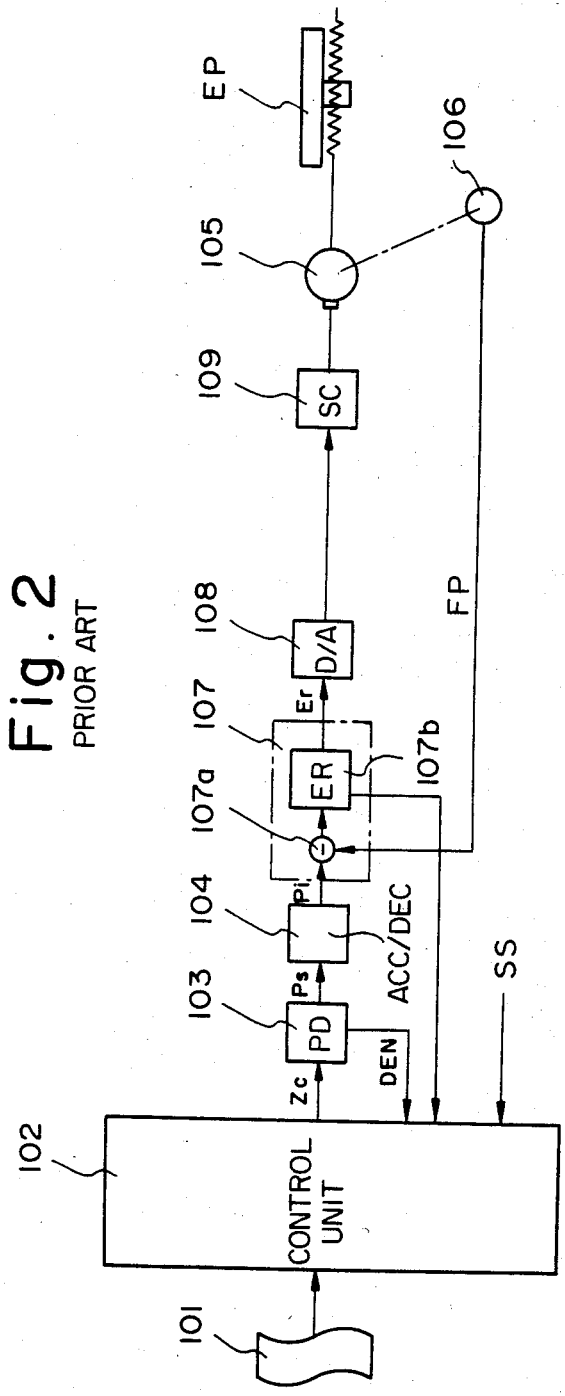
FIG. 2 is block diagram of a an electric discharge machine control apparatus according to the prior art.
Figure 3:
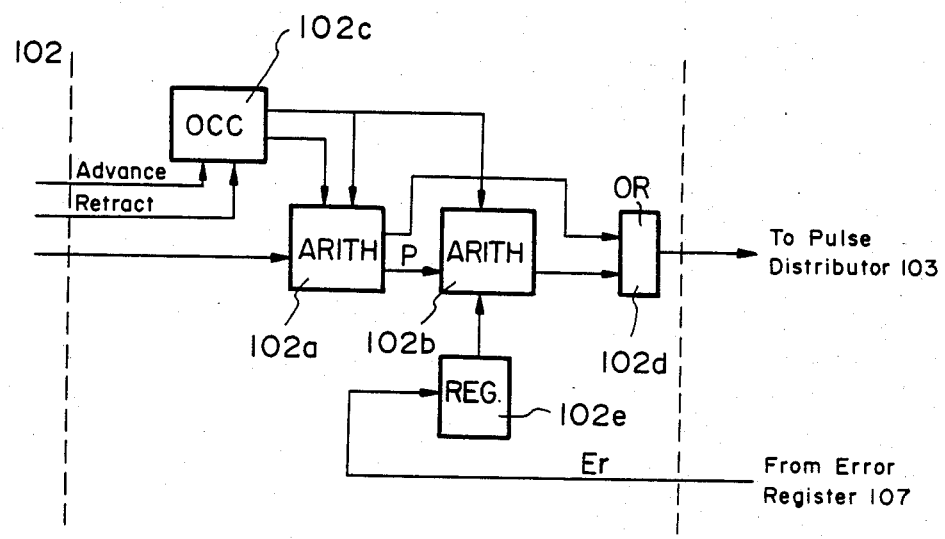
FIG. 3 is a block diagram illustrating a principal portion of a reversal control apparatus according to an embodiment of the present invention.

Reference will now be had to FIG. 3 to describe a first preferred embodiment of the present invention. Portions similar to those of the prior-art arrangement of FIG. 2 are designated by like reference characters. As illustrated in FIG. 3, the control unit 102 includes means, which will now be described, for generating the a move command, coupled to the pulse distributor 103. Specifically, the control unit 102 includes an arithmetic circuit 102a for computing a move command value from a move command input thereto and an arithmetic circuit 102b for computing a reversal command value based on the contents of a register 102e when the electrode EP is reversed in direction. An operation control circuit 102c places the arithmetic circuits 102a or 102b into operation in response to an advance or retraction signal from a common controller, not shown, located within the control unit 102. An OR circuit 102d delivers the outputs of the arithmetic circuits 102a or 102b to the pulse distributor 103. The above-mentioned register 102e stores the contents Er of the error register 107b (FIG. 2).

In operation, assume that the system is in the operating mode for advancing the electrode EP. The controller, not shown, applies an advance command to the operation control circuit 102c and delivers command data to the arithmetic circuit 102a. The latter, based on a signal from the operation control circuit 102c, computes an incremental value from the command data and delivers a signal indicative of this value to the pulse distributor 103 through the OR gate 102d. Operation for transporting the electrode EP then proceeds in the manner described above in connection with FIG. 2.

Figure 1:
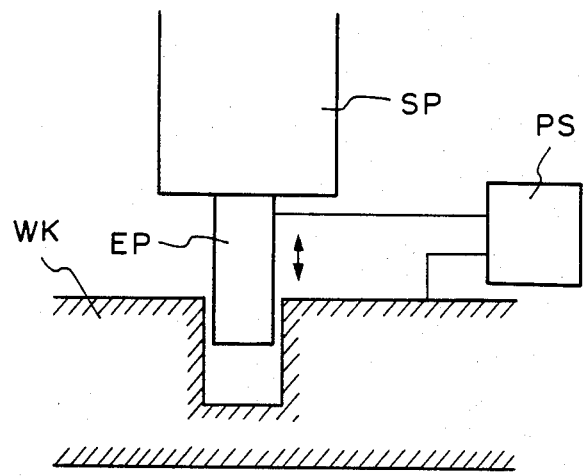
FIG. 1 is a simplified diagrammatic view of an electric discharge machine to which the present invention can applied.

Now assume that the electrode EP contacts the workpiece WK and a short-circuit signal SS is generated. In response to receipt of the short-circuit signal SS, the controller delivers a retraction command to the operation control circuit 102c and reversal command data to the arithmetic circuit 102a. The latter, based on a signal from the operation control circuit 102c, computes a reversal command value P from the reversal command data and delivers a signal indicative of this value to the arithmetic circuit 102b. Since the controller puts the value ER stored in register 107b (FIG. 1) into the register 102e when the short-circuit signal SS is generated, the arithmetic circuit 102b computes the difference between the value P from the arithmetic circuit 102a and the value Er stored in register 102e, delivering a signal indicative of the result, namely P−Er, to the pulse distributor 103 through the OR dircuit 102d.

Assuming that the direction of advance is the positive direction and the direction of retraction the negative direction, the advance command will be a positive value so that the value of Er in the error register 107b should also be positive. On the other hand, to reverse the direction of the electrode, the value applied to the arithmetic circuit 102b as the retraction command P will be negative (i.e., −P). Accordingly, the value computed and delivered by the arithmetic circuit 102b as an output will be −P−Er. This value, delivered to the error computing and storing unit 107 through the pulse distributor 103 and the accelerator/decelerator 104, is added to the contents Er of the error register 107b by the adding circuit 107a. Therefore, the data stored in the register 107b becomes −P [=(−P−Er)+Er], which is exactly the reversal command value. In other words, the error Er, namely the value indicating the amount of forward (advance) movement which would have been traveled by the electrode, is cancelled and replaced by the reversal command value −P. This permits the electrode retraction operation to begin immediately.

Changing the movement of the electrode EP from the retracting direction to the advancing direction, to resume machining, is much the same. Specifically, since the retraction command has a negative value, the value Er in the error register 107b will be negative. The command P for advancing the electrode, i.e., for reversing its direction, will be positive. Consequently, the output of the arithmetic circuit 102b will be [P−(−Er)]=P+Er. Since the value Er in the error register 107b is negative, the arithmetic circuit 107a performs the operation [(P+Er)−Er]=P. Therefore, the data stored in the error register 107b is the value P, which is exactly the advance command value. Thus, the advance operation to resume machining of the workpiece WK by the electrode EP begins without delay.

It should be noted that the foregoing effects can be achieved based directly on the contents of the register 102e, instead of computing the reversal command value P. Specifically, for reversing direction using such an arrangement, the arithmetic circuit 102a would produce a signal indicative of a coefficient −n (where n>1), and the arithmetic circuit 102b would multiply the value Er in the register 102e by the coefficient −n, delivering the result −n×Er. Then, by performing the above-described operations, the contents of the error register 107b would take on the value [(1−n)×Er], allowing the reversing operation to take place without delay. For example, if coefficient n equals 2, the advancing and retracting speeds would be the same.

It should also be noted that the functions of the arithmetic circuits 102a, 102b can be performed by a single circuit by making use of a well-known microcomputer. Thus, with the foregoing embodiment, a prescribed reversal command value can be provided promptly regardless of the magnitude of Er stored in the error register 107b.

Figure 4:
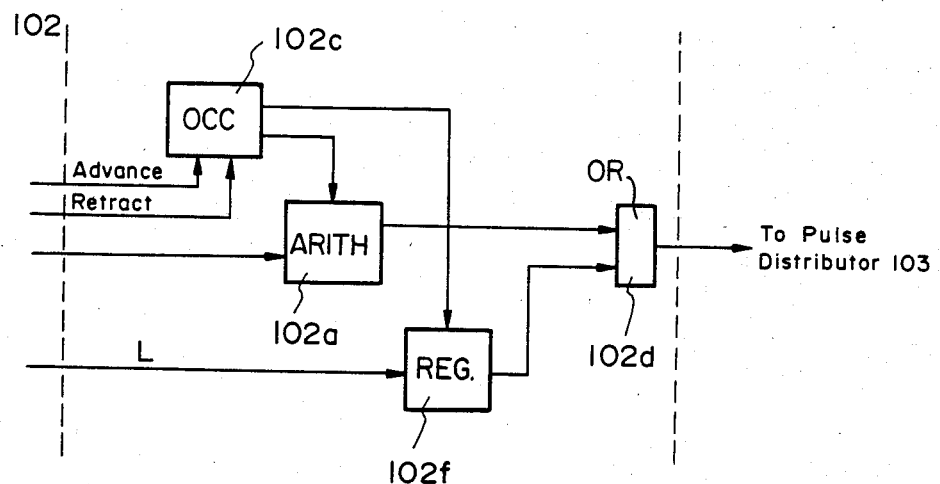
FIG. 4 is a block diagram illustrating a principal portion of a reversal control apparatus according to another embodiment of the present invention.

A second embodiment of the present invention will now be described with reference to FIG. 4. Portions similar to those of FIG. 3 are designated by like reference characters. The arrangements of FIG. 4 is provided with a parameter register 102f in which a value L is set externally, such as by a switch. This embodiment of the invention does not include the arithmetic circuit 102b or the register 102e.

In operation, assume that the system is in the operating mode for advancing the electrode EP. As described in conjunction with the first embodiment of FIG. 3, a controller, not shown, applies an advance command to the operation control circuit 102c and delivers command data to the arithmetic circuit 102a. The latter, based on a signal from the operation control circuit 102c, computes a move command value (incremental) from the command data and delivers a signal indicative of this value to the pulse distributor 103 through the OR gate 102d. Operation for transporting the electrode then proceeds in the manner described above in connection with FIG. 2.

Now asume that the electrode EP contacts the workpiece WK. In response to receipt of the short-circuit signal SS, the controller delivers a retraction command to the operation control circuit 102c, which proceeds to read the value L out of the parameter register 102f and deliver the value to the pulse distributor 103 through the OR gate 102d. The value L is required to be large enough to cancel the value Er in the error register 107b so that a direction reversal will be commanded. For example, since the maximum value of Er will be the move command value P, it will suffice if L is set to a value no less than P.

As an alternative to setting an value of L by the external switch, L can be obtained, and then set in the parameter register 102f, by using the move command value P computed in the arithmetic circuit 102a in response to a previous signal from the controller. In accordance with either alternative of this embodiment of the present invention, therefore, the value Er remaining in the error register 107b can be offset, thereby permitting prompt reversal of direction, merely by providing the parameter register 102f.

The direction reversal method of the present invention will be better understood by referring to the flowchart of FIG. 5. In a case where the electric discharge machine is in the machining mode for advancing the electrode EP, a reversal control sequence is initiated when the short-circuit signal SS goes high (ON). Three methods are available for reversing direction, any one of which is capable of being selected. In the first method (branch 1), described above, the command value P for movement in the reverse direction is computed by the arithmetic circuit 102a, the difference between P and the contents of the register 102e (namely P−Er) is computed by the arithmetic circuit 102b, and the value of P−Er is delivered to the pulse distributor 103. In the second method (branch 2), also described earlier, the command value P for reversal of direction is not computed. Rather, the arithmetic circuit 102a delivers the coefficient n (n>1), and the arithmetic circuit 102b takes the product of −n and the value Er in the error register and delivers the result as an output signal. In the third method (branch 3), which corresponds to the second embodiment of the invention having the parameter register 102f, the value of L within the register 102f is set to a fixed value no less than the move command value P, which is the maximum value stored in the error register 107b, thereby cancelling the value remaining in the error register 107b. The sign of L is negative for reversing the advance of the electrode EP and positive for reversing the retraction of the electrode EP. Thus, the electrode EP can be retracted or "backed up" immediately regardless of which method is used.

When the electric discharge machine is operating in the retraction mode and the short-circuit signal SS reverts to the low level (OFF), processing moves to a decision step similar to that described above for the advance mode, namely a step which calls for the decision regarding the three available methods of reversing direction. Regardless of the method, the retraction mode can be changed to the advance mode without delay.

In accordance with the present invention as described and illustrated hereinabove, a reversal command value P greater than the value Er in the error computing and storing unit 107 is generated as a command signal in response to generation of the short-circuit signal SS. As a result, the contents Er of the error computing and storing unit 107 can be set to a value for a reversal of direction without delay. Accordingly, the electrode EP can be retracted immediately upon generation of the short-circuit signal SS, thereby preventing damage to the electrode EP by diminishing the duration of the short circuit. Prompt retraction of the electrode EP also permits machining to resume earlier and, hence, shortens the time required for the machining process.

It should be noted that the invention is not limited to the illustrated embodiments, but can also be applied to a reversal control apparatus for a wire-cut electric discharge machine.

As many apparently widely different embodiments of the present invention can be made without departing from the spirit and scope thereof, it is to be understood that the invention is not limited to the specific embodiments thereof except as defined in the appended claims.

What we claim is:

1. A method of reversing a feed direction of an electric discharge machine having an electrode which is moved relative to a conductive workpiece in response to a command signal from a control means having an error computing and storing means for controlling the electrode, an arithmetic difference between the value of the command signal and a number of pulses, each of which is generated for each prescribed increment of movement of the electrode, is computed and stored as an error in the error computing and storing means, and the electrode is subsequently driven in accordance with the error stored in the error computing and storing means, the electrode machining the workpiece by an electric discharge developed across the electrode and the workpiece, said method comprising the steps of:
   (a) generating, as the command signal in response to a short-circuit signal produced when the electrode contacts the workpiece, a reversal command value larger than the error stored in the error computing and storing means; and
   (b) converting, using the reversal command value generated in step (a), the error stored in the error computing and storing means into a value for immediately reversing the direction of the electrice discharge machine.

2. A method according to claim 1, wherein said step (a) comprises the substeps of:
   (ai) reading the error out of the error computing and storing means; and
   (aii) producing the reversal command value based on the error read in said substep (ai).

3. A method according to claim 1,
   wherein the control means has a memory, and
   wherein the reversal command value is stored in the memory and delivered from the memory in response to the short-circuit signal.

4. A method according to claim 1, wherein said step (a) comprises the substeps of:
   (ai) computing a pulse distribution command value for a reverse direction which is opposite to the feed direction, and
   (aii) computing a difference value by subtracting the error in the error computing and storing means from the pulse distribution command value.

5. A method according to claim 1, wherein said step (a) comprises the substeps of:
   (ai) producing a coefficient −n; where n is greater than one; and
   (aii) computing a product of the coefficient −n and the error stored in the error computing and storing unit.

6. A method according to claim 1, wherein said step (a) comprises the substeps of:
   (ai) storing a fixed value not less than a maximum value capable of being stored in the error computing and storing means, and
   (aii) delivering the fixed value as the reversal command value for reversing the feed direction of the electric discharge machine, the sign of the fixed value being negative when the movement of the electrode is in an advancing direction, and positive when the movement of the electrode in in a retracting direction.

7. An apparatus for reversing a feed direction of an electric discharge machine having means for moving an electrode relative to a conductive workpiece and control means for generating advance and retraction signals and a command signal, having a value, which commands movement of the electrode, pulse generating means for generating a number of pulses with each prescribed increment of movement of the electrode, an error computing and storing means for computing and storing an error between the value of the command signal and the number of the pulses, and a drive means for driving the electrode in accordance with the error stored in the error computing and storing means, the electrode machining the workpiece by an electric discharge developed across the electrode and the workpiece, said apparatus comprising:
   command signal means for generating, as the command signal in response to one of the advance and retraction signals from the control means, a reversal command value larger than the error stored in the error computing and storing means; and
   means, operatively connected to said command signal means, for converting, using the reversal command value, the error in the error computing and storing means into a value for immediately reversing the feed direction of the electric discharge machine.

8. An apparatus according to claim 7, wherein said command signal means comprises:
   first arithmetic means, operatively connected to the control means, for computing the reversal command value based on the command signal from the control means and producing an output signal;
   a register, operatively connected to the error computing and storing means, for storing the error from the the error computing and storing means;
   second arithmetic means, operatively connected to said first arithmetic means and said register, for computing a difference between the output signal from said first arithmetic means and the error stored in said register; and
   an OR gate, operatively connected to said first and second arithmetic means and the error computing and storing unit, for delivering the reversal command value to the error computing and storing means.

9. An apparatus according to claim 8, wherein the output signal produced by said first arithmetic means is a coefficient −n, where n is greater than one, when the apparatus is in a reversing mode, and said second arithmetic means includes means, operatively connected to said first arithmetic means, said register and said OR gate, for multiplying the coefficient −n times the error stored in said register.

10. An apparatus according to claim 7, wherein said command signal means comprises:
    arithmetic means, operatively connected to the control means and the error computing and storing means, for computing the reversal command value based on the command signal from the control means; and
    means, operatively connected to the control means and the error computing and storing means, for setting the reversal command value to a fixed value not less than a maximum value capable to being stored in the error computing and storing means, and for setting the reversal command value to a negative value when the movement of the electrode is in an advancing direction, and positive when the movement of the electrode is in a retracting direction.

11. An apparatus according to claim 7, wherein the electrode is a wire electrode.

12. An apparatus for reversing a feed direction of an electric discharge machine having an electrode which is moved relative to a conductive workpiece, the electric discharge machine generating a short-circuit signal when the electrode is to be reversed, said apparatus comprising:

command signal means, operatively connected to the electric discharge machine, for generating a reversal command value, when the short-circuit signal is generated; and error computing and storing means, operatively connected to said command signal means and the electric discharge machine, for storing an error between the reversal command value and a previously stored error, the reversal command value being opposite in sign and larger in absolute value compared to the previously stored error.

13. A method of reversing a feed direction of an electric discharge machine having an electrode which is moved in dependence upon an error in an error computing and storing circuit, a short-circuit signal being generated by the electric discharge machine when the electrode is to be reversed, said method comprising the steps of:

(a) generating a command signal opposite in sign and larger in absolute value compared to the error stored in the error computing and storing circuit in response to the short-circuit signal; and (b) changing the error stored in the error computing and storing circuit in dependence upon the command signal generated in said step (a).

* * * * *

UNITED STATES PATENT AND TRADEMARK OFFICE
CERTIFICATE OF CORRECTION

PATENT NO. : 4,567,342
DATED : January 28, 1986
INVENTOR(S) : Nozawa et al.

It is certified that error appears in the above-identified patent and that said Letters Patent is hereby corrected as shown below:

Col. 2, line 11, delete "by".
Col. 3, line 21, "wherein" should be --whereby--;
line 28, "contact" should be --contacts--;
line 46, after "is" insert --a--;
line 46, "a an" should be --an--;
line 64, delete entire line and insert --circuits for generating--.

Col. 4, line 40, "dircuit" should be --circuit--.
Col. 5, line 64, "an value" should be --the value--;
line 64, "by the" should be --by an--.
Col. 7, line 25, "electrice" should be --electric--.
Col. 8, line 60, "to" should be --of--.

Signed and Sealed this

Seventeenth Day of June 1986

[SEAL]

Attest:

DONALD J. QUIGG

Attesting Officer

Commissioner of Patents and Trademarks